United States Patent

Sano

[11] Patent Number: 5,802,814
[45] Date of Patent: Sep. 8, 1998

[54] METHOD OF WRAPPING A BUNDLE OF FIBER

[75] Inventor: Kazuhiko Sano, Kusatsu, Japan

[73] Assignee: Nissho Corporation, Osaka, Japan

[21] Appl. No.: 513,635

[22] Filed: Aug. 10, 1995

Related U.S. Application Data

[63] Continuation-in-part of Ser. No. 276,402, Jul. 18, 1994, abandoned.

[30] Foreign Application Priority Data

Aug. 20, 1993 [JP] Japan .................................. 5-228253

[51] Int. Cl.$^6$ ................................................... B21D 39/06
[52] U.S. Cl. ............................. 53/438; 29/419.1; 29/452; 29/890.032; 53/473; 264/229
[58] Field of Search ............................ 53/438, 529, 473, 53/236, 255; 29/418, 419.1, 424, 433, 452, 458, 890.032; 264/229, DIG. 75

[56] References Cited

U.S. PATENT DOCUMENTS

| | | | |
|---|---|---|---|
| 2,057,121 | 10/1936 | Trevellyan | ............... 53/473 X |
| 2,182,330 | 12/1939 | Windeler . | |
| 2,311,704 | 2/1943 | Simison | ................. 53/438 X |
| 2,438,156 | 3/1948 | Dodge | ........................ 264/DIG. 75 X |
| 3,093,162 | 6/1963 | Reiling . | |
| 3,101,526 | 8/1963 | Paullus et al. . | |
| 4,105,731 | 8/1978 | Yamazaki | .................... 264/DIG. 75 X |
| 4,138,460 | 2/1979 | Tigner . | |
| 4,715,105 | 12/1987 | Beaver . | |
| 5,064,496 | 11/1991 | Asanuma et al. . | |
| 5,179,778 | 1/1993 | Dickson et al. . | |

*Primary Examiner*—Joseph M. Gorski
*Attorney, Agent, or Firm*—Armstrong, Westerman, Hattori, McLeland & Naughton

[57] ABSTRACT

A fiber bundle is wrapped with a tape by helically and entirely winding the tape around the bundle, while applying a constant longitudinal tension to the bundle; and thereafter unwinding and removing the tape from its last turn to gradually expose the bundle towards its basal end, while inserting the exposed portion of the bundle gradually into a cylindrical protector. The method keeps constant the outer diameter of the bundle by adjusting the tape tension, even if the bundles are composed of varied numbers of fibers in one protector, so that a wider use of the protector is realized. In the method, the wrapping operation does not produce any damaged fibers from which a fluid such as blood leaks in a hollow fiber apparatus, and no later adjustment is necessary for the wrapped bundles, thus improving the production efficiency.

2 Claims, 4 Drawing Sheets

METHOD OF WRAPPING A BUNDLE OF FIBER

CROSS-REFERENCE TO RELATED APPLICATION

This is a continuation-in-part of application Ser. No. 08/276,402 field on Jul. 18, 1994, and now abandoned.

BACKGROUND OF THE INVENTION

The present invention relates to a method of wrapping a bundle of fiber, and more particularly relates to a method of wrapping a bundle of hollow fiber so as to subsequently fill a tube with the bundle, wherein the hollow fiber is such as widely used in the field of blood treatment, reverse osmosis, heat exchange or the like.

Usually, fiber bundles have been cut into predetermined lengths to be accommodated in tubes or cylindrical containers. For protection of the bundles from damage during the cutting and insertion processes, each bundle has been wrapped with a protective sheet before cut into the lengths. FIG. 5 shows a fiber bundle 21 enclosed with a sheet 22, and FIG. 6 is a cross section thereof. The protective sheet 22 is tightened and a longitudinal edge thereof is anchored to a body portion of the sheet at several portions by some lengths of a one-side adhesive tape 23.

When winding the sheet 22 on the fiber bundle 21, some hollow fibers 24 included in an outer layer thereof tend to be jammed in the piled portions of the sheet. The jammed fibers 24 are likely to be damaged, bent and/or broken not only during the wrapping step but also while inserting the bundle 21 together with the sheet 22 into the container. In use of a hollow fiber apparatus, the damaged hollow fibers 24 in the bundle have caused certain serious problems such as a leakage of blood flowing through the fibers.

Therefore, the wrapping of hollow fiber bundle 21 with the sheet 22 have had to be carried out carefully to avoid the jamming of fibers 24. If such a jamming is found in an already wrapped bundle 21, it must be repaired manually. The repairing work has thus rendered production efficiency low.

A few pieces of the one-side adhesive tape 23 fastening the sheet edge have not been enough to ensure a smooth transportation of the bundles on an assembly line. This is because some curled edges of the sheet often have collided or interfered with any objects or parts present along the line.

The bundles 21 simply wrapped with the sheets 22 have not been of an invariable shape but of a somewhat depressed shape in cross section Thus, it has not been easy to set those bundles in coaxial alignment with the containers in hollow fiber apparatuses.

An object of the present invention, which was made to resolve those problems inherent in the prior art method, is therefore to provide an improved method of wrapping a bundle of fiber.

SUMMARY OF THE INVENTION

The method proposed herein comprises the preliminary step of applying a predetermined tension to the bundle longitudinally thereof and at opposite ends of the bundle. The present method characteristically comprises the further steps of: wrapping a flexible tape helically around the bundle and from one of the opposite ends towards the other end so that the tape covers the bundle almost entirely, while maintaining the tension preliminarily applied thereto; and finally unwinding the tape off the bundle so as to expose the bundle gradually from the other end towards the one end, while synchronously inserting the thus exposed portion of the bundle gradually into a cylindrical protector.

BRIEF DESCRIPTION OF THE DRAWINGS

Now, an embodiment of the present invention will be described referring to the drawings, in which.

DETAILED DESCRIPTION

Figure 1:
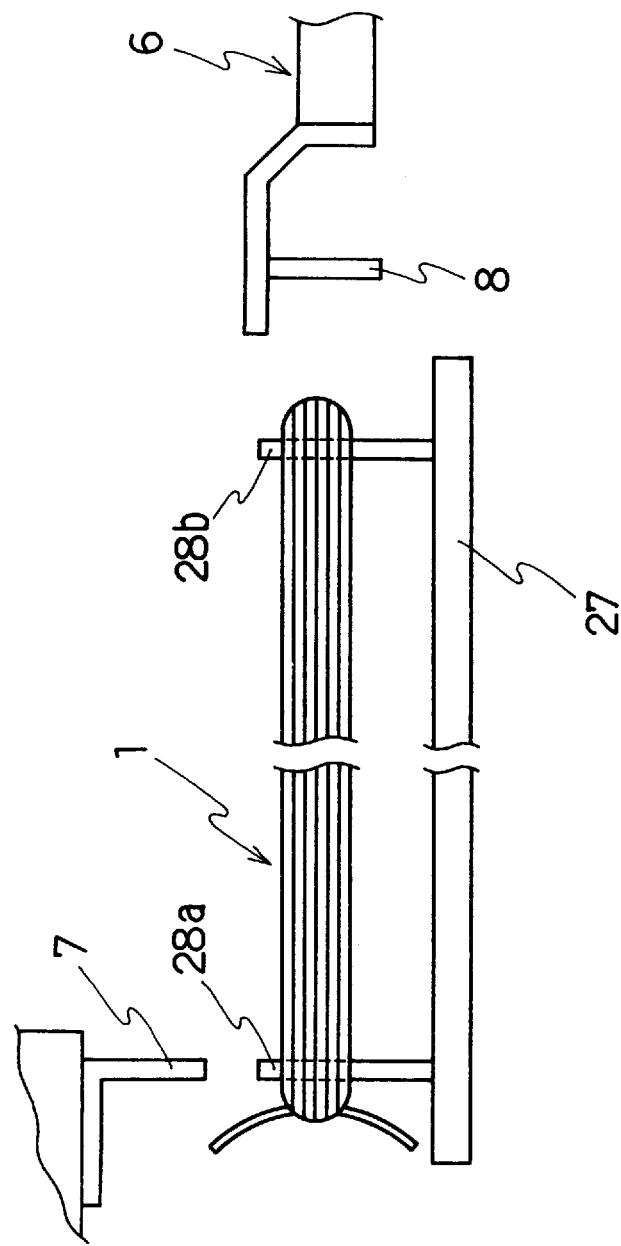
FIG. 1 is an explanatory view showing engagement of two pins in a bundle of hollow fibers.

In an embodiment shown in FIGS. 1 to 4, a system for performing the steps comprises a bundle 1 of hollow fiber, a cylindrical protector 2 and a tape 3. The system further comprises a rod 4 for supporting the protector, a taping unit 5 and a tension unit 6 for applying a predetermined tension to the fiber bundle.

First of all, the bundle 1 of hollow fibers is wound in skein-shape around two supporting bars 28a and 28b provided to both ends of a base plate 27 as shown in FIG. 1.

Figure 2:
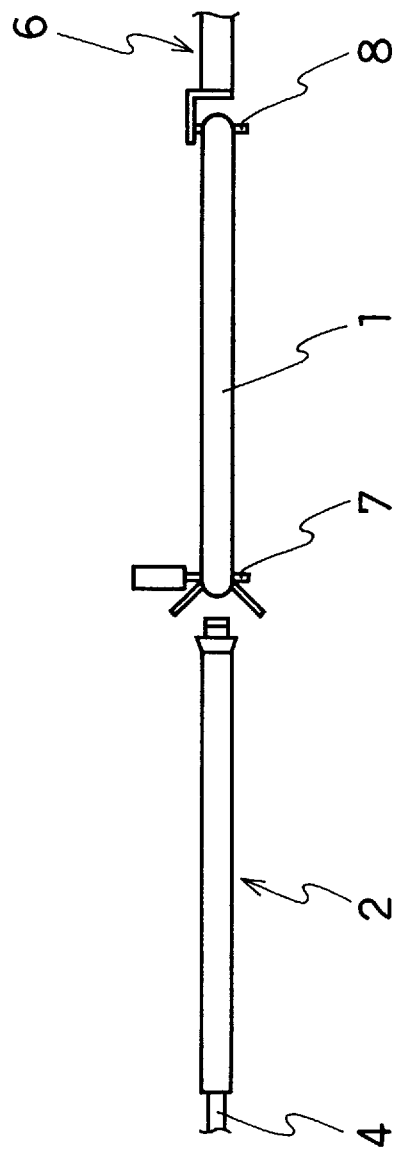
FIG. 2 is an explanatory view showing a preliminary step before a tape is wound around the bundle.

Under this condition, the pins 7 and 8 are inserted into both ends of the bundle 1 supported by the two supporting bars 28a and 28b to support the bundle 1 in place of the supporting bars 28a and 28b. FIG. 2 shows this condition wherein the bundle is supported by the pins 7 and 8, that is, the bundle is wound around the pins 7 and 8.

In FIG. 2, when the pin 8 is moved rightward by means of an air cylinder (not shown) of a tension unit 6 for applying a predetermined tension to the fiber bundle 1, a predetermined tension is applied to the fiber bundle 1 in its longitudinal direction since the left-hand end of the fiber bundle 1 is fixed by an engaging pin 7. The rod 4 extends away from and in axial alignment with the fiber bundle 1 and supports thereon the cylindrical protector 2.

The protector 2 is usually made of a thermoplastic resin such as polypropylene, and generally has a wall thickness of about 0.35 mm The protector may be transparent or translucent so that the interior thereof can be seen through its wall. An inner peripheral surface of the protector is preferably satin-finished or otherwise roughened to allow the fiber bundle to slide smoothly.

Figure 3:
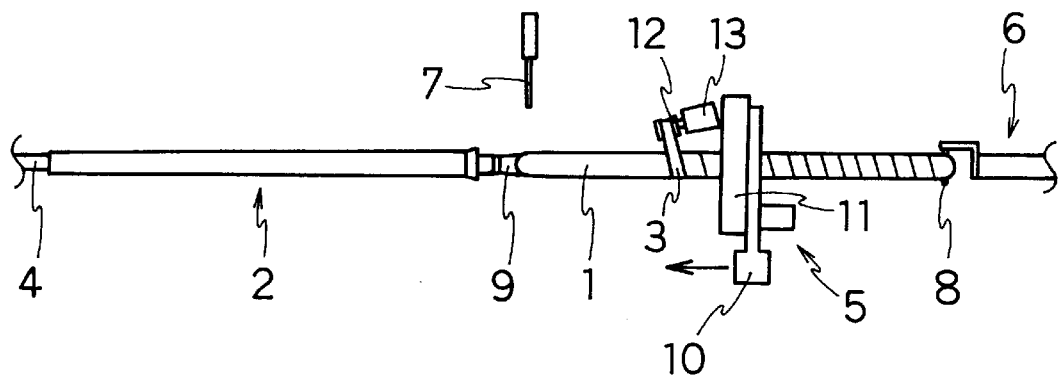
FIG. 3 is a schematic side elevation of a system in which the tape is wound on the hollow fiber bundle.

Subsequent to the described preliminary step, the tape is wound around the fiber bundle 1 in a manner as shown in FIG. 3. In detail, a string joint 9 is secured to the left-hand end of the bundle and to a right-hand end of the protector-supporting rod 4, and then the engaging pin 7 is removed from the left-hand end of the bundle 1. The joint 9 may for example be a string loop or a pair of strings engageable with or knottable to the end of the rod 4. Then, a rotary and annular head 11 on a movable stand 10 of the taping unit 5 takes a start position causing the head 11 to surround the right-hand end of fiber bundle 1. A free end of the tape 3 wound around a reel 12 on the head is removably fixed to the bundle 1, at its portion adjacent to the right-hand end. The tape 3 is made of polyethylene, polyfluoride resin, polypropylene, polyvinyl chloride, polyvinylidene chloride or the like. Next, a motor (not shown) starts to drive the rotary and annular head 11 to the left while spinning about its own axis. Thus, the tape unwound from a reel 12 is wound in a helical manner on the bundle 1, over a full length of the bundle 1 except for its opposite ends. A torque motor 13 operatively connecting the reel 12 to the head 11 is controlled to regulate the tension of the tape 3.

Figure 4:
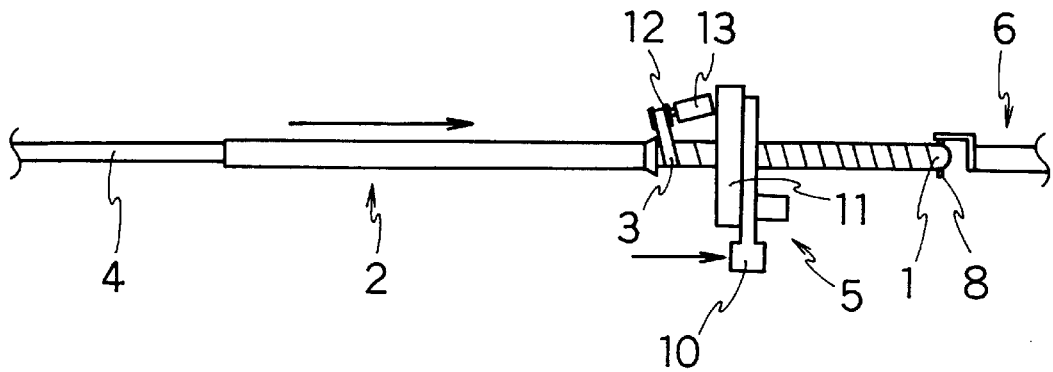
FIG. 4 also shows the system in its state to unwind the tape and to insert the bundle into a cylindrical protector.
Figure 5:
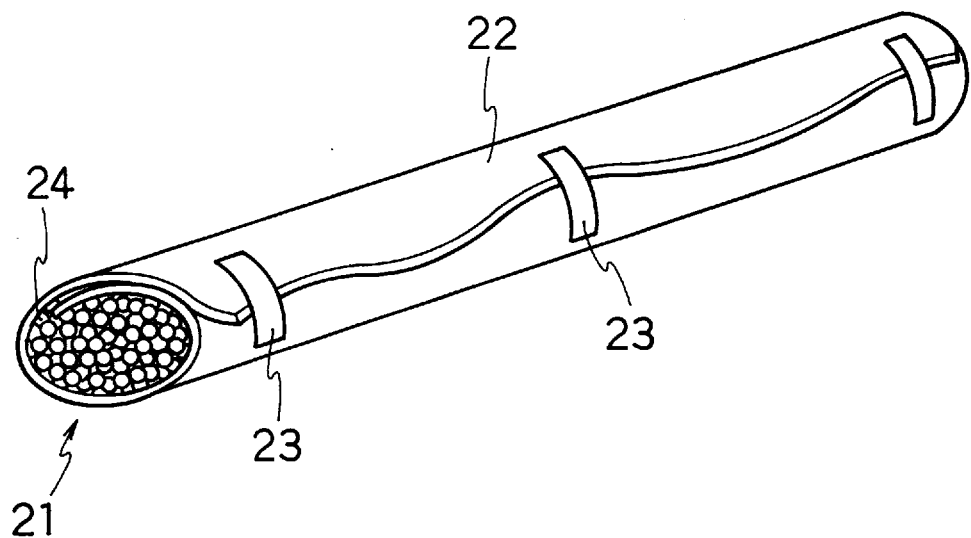
FIG. 5 is a perspective view of a hollow fiber bundle wrapped by the prior art method.
Figure 6:
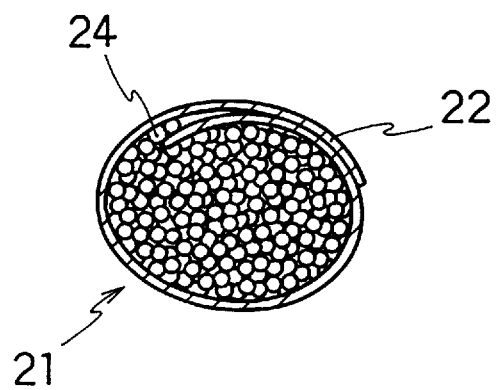
FIG. 6 is a cross section of the bundle shown in FIG. 5.

After the tape 3 has wrapped the hollow fiber bundle 1, the protector 2 held on the rod 4 is driven to the right a little distance. Thus, the right-hand end of the protector 2 fits on the left-hand bare end of the bundle 1, as shown in FIG. 4. Then, the head 11 of the taping unit 5 starts to rotate in reverse direction contrary to that shown in FIG. 3. Synchronously with the rotation of the head 11, the movable stand 10 driven by the motor advances to the right. Due to such synchronous motions of the head 11 and stand 10, the tape 3 is continuously unwound from its last and left-hand turn back to its first and right-hand turn so as to gradually expose the bundle 1, while inserting at the same time the thus exposed portion of the bundle 1 gradually into the cylindrical protector 2. The torque motor 13 continues to operate the reel 12 to maintain the tension of the tape at a desired level, similarly to the step shown in FIG. 3. The tape's free end removably fixed to the bundle's right-hand end is ready to slip off it, thus enabling the hollow fiber bundle 1 to be covered entirely with the protector 2. In a subsequent casing process, the bundle 1 in the protector 2 is axially aligned with a cylindrical container in a hollow fiber apparatus. It will be understood that the method described above is applicable also to the wrapping of fiber bundles other than the the hollow fiber bundle.

In summary, the method comprises the step of helically winding a tape around the bundle entirely from one end thereof towards the other end, while urging these ends in opposite directions to maintain the longitudinal tension. Subsequently, the tape is unwound from the bundle which is thus exposed gradually from the other end towards the one or basal end, while synchronously inserting the thus exposed portion of the bundle gradually into a cylindrical protector.

EXAMPLES 1 TO 3

Three examples of bundles were prepared Example 1 comprised hollow fibers, the number of which was "A". Examples 2 and 3 respectively comprised "A−500" and "A+500" fibers. All the Examples had almost the same outer diameter of the bundle in which the fibers were packed, and this diameter was maintained during the tape winding and unwinding steps. A tape was wound on and unwound from each Example under tensions, which are shown in Table 1 together with the values of "packed ratio" given below by the equation (1).

Packed ratio of fiber bundle=[{(Cross-sectional area defined by outer periphery of one fiber)×number of fibers}/(cross-sectional area defined by inner periphery of a cylindrical protector)]×100   (1)

TABLE 1

| Examples | Winding tension (g) | Unwinding tension (g) | Packed ratio (%) |
| --- | --- | --- | --- |
| 1 | 500 | 200 | 45 |
| 2 | 300 | 200 | 42 |
| 3 | 700 | 200 | 47 |

As can be seen from Table 1, the increasing number of the fibers packed in one bundle caused a higher winding tension of the tape and a higher packed ratio of the fibers. However, the tape unwinding tension remained the same to assure the same outer diameter of the bundles.

According to the present invention, the outer diameter of the fiber bundle can be kept almost constant even if the number of wrapped fibers per bundle would vary within a little range. Such a constant bundle diameter is realized due to the adjustment of the winding and unwinding tensions of tape. Thus the cylindrical protector of a given inner diameter can receive and hold a variable number of fibers, so that a wider use of the protector is realized. The wrapping operation would scarcely damage the fibers, thereby diminishing a possibility that a fluid such as blood leaks sideways from the fibers installed in a hollow fiber apparatus. Further, any later and manual adjustment of the already wrapped bundles is no longer necessary, thus improving the production efficiency.

What is claimed is:

1. A method of packing a bundle of fiber comprising the steps of:

providing a bundle of fiber;

applying a predetermined tension to the bundle longitudinally thereof and at opposite ends of the bundle;

then wrapping a tape helically around the bundle and from one of the opposite ends towards the other end so that the tape covers the bundle almost entirely, while maintaining the tension applied thereto; and finally unwinding the tape off the bundle thereby exposing the bundle gradually from the other end towards the one end, while inserting the thus exposed portion of the bundle gradually into a cylindrical protector, thereby filling the bundle into the cylindrical protector.

2. The method of claim 1, further including the step of providing a taping unit comprising a rotary and annular head, a reel of tape, and a torque motor connecting the reel to the annular head, and wherein:

said wrapping step includes surrounding the bundle with the annular head, and causing the annular head to traverse the bundle in a first direction while spinning thereabout in a second direction, such that the tape unwinds from the reel and wraps the bundle helically while the motor regulates the tension of the tape; and said unwinding step includes surrounding the bundle with the annular head, and causing the annular head to traverse the bundle in a third direction opposite the first direction while spinning thereabout in a fourth direction opposite the second direction, such that the tape unwinds from the bundle while the motor regulates the tension of the tape.

* * * * *